United States Patent

Matuschek

[19]

[11] Patent Number: 6,012,379
[45] Date of Patent: Jan. 11, 2000

[54] FILTER HOLDER FOR COFFEE MACHINE OF THE ESPRESSO TYPE

[75] Inventor: Manfred Matuschek, Solingen, Germany

[73] Assignee: Robert Krups GmbH & Co., KG, Solingen, Germany

[21] Appl. No.: 09/117,414

[22] PCT Filed: Jan. 21, 1997

[86] PCT No.: PCT/EP97/00261

§ 371 Date: Sep. 30, 1998

§ 102(e) Date: Sep. 30, 1998

[87] PCT Pub. No.: WO97/26815

PCT Pub. Date: Jul. 31, 1997

[30] Foreign Application Priority Data

Jan. 25, 1996 [FR] France ................................. 96/00882

[51] Int. Cl.[7] .................................................. A47G 19/14
[52] U.S. Cl. ............................ 99/323; 99/299; 99/302 R
[58] Field of Search ............................. 99/293, 295, 299, 99/302 R, 323; 426/433

[56] References Cited

U.S. PATENT DOCUMENTS 5,150,645   9/1992   Schiettecatte ............................. 99/295
5,473,973  12/1995   Cortese ...................................... 99/295
5,634,394   6/1997   Cortese ...................................... 99/295

FOREIGN PATENT DOCUMENTS 0 264 352  10/1987  European Pat. Off. .
0 449 792   3/1991  European Pat. Off. .
0 682 902  10/1994  European Pat. Off. .
2 636 828   9/1989  France .

*Primary Examiner*—Reginald L. Alexander
*Attorney, Agent, or Firm*—Darby & Darby

[57] ABSTRACT

Filter-holder comprising a cup (3) receiving a coffee filter (10) and having a perforated bottom, a body (25) arranged under the filter, an infusion collecting chamber (41) opening into a channel (43) of which the outlet (45) communicates with at least one distribution funnel (32), and a foam-forming device. According to the invention, the channel (43) extends annularly about a bossing (39) provided on the body, and the foam-forming device has an elastic annular seal (48) arranged about the bossing, closing the outlet (45) of the channel (43) and deformable by expansion in order to form at least one infusion flowing passage (51). Application particularly to a filter-holder for domestic coffee machines.

7 Claims, 2 Drawing Sheets

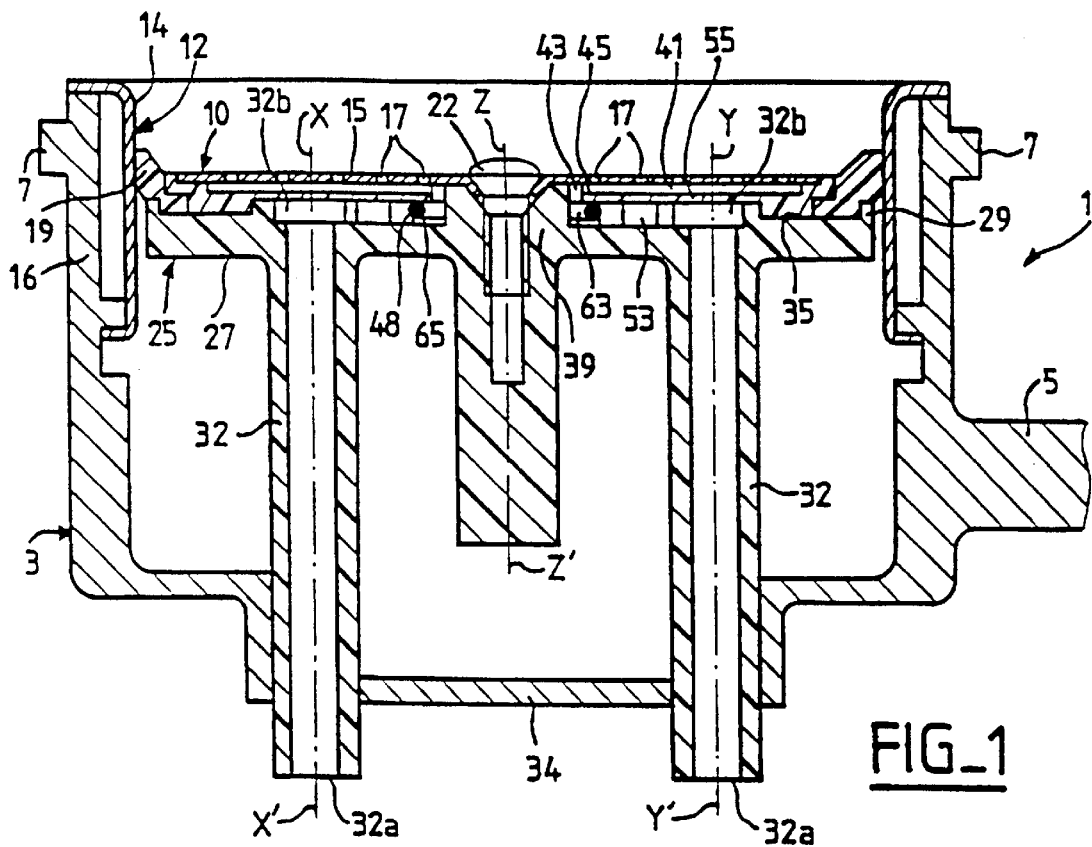
FIG_1
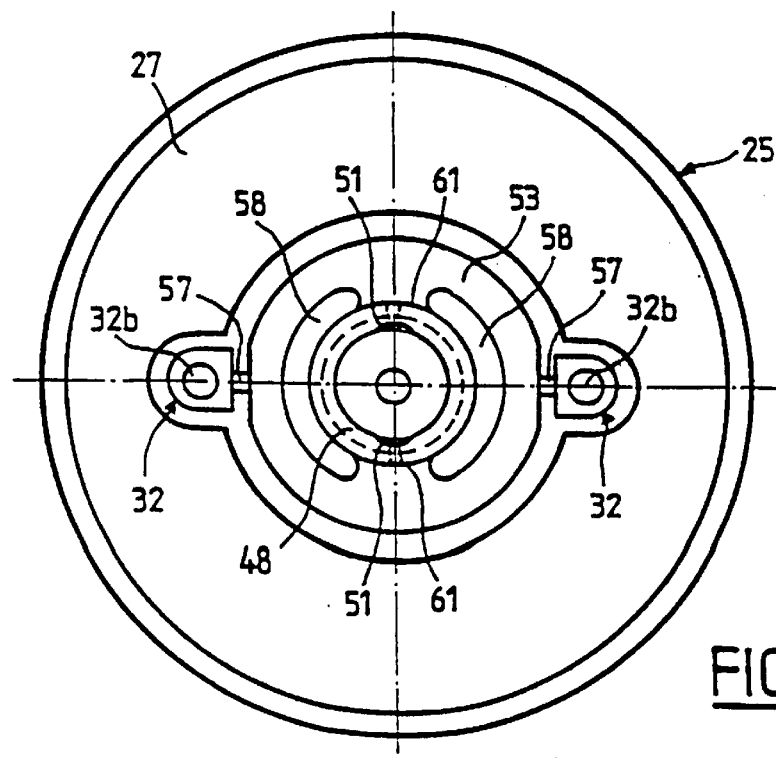
FIG_2

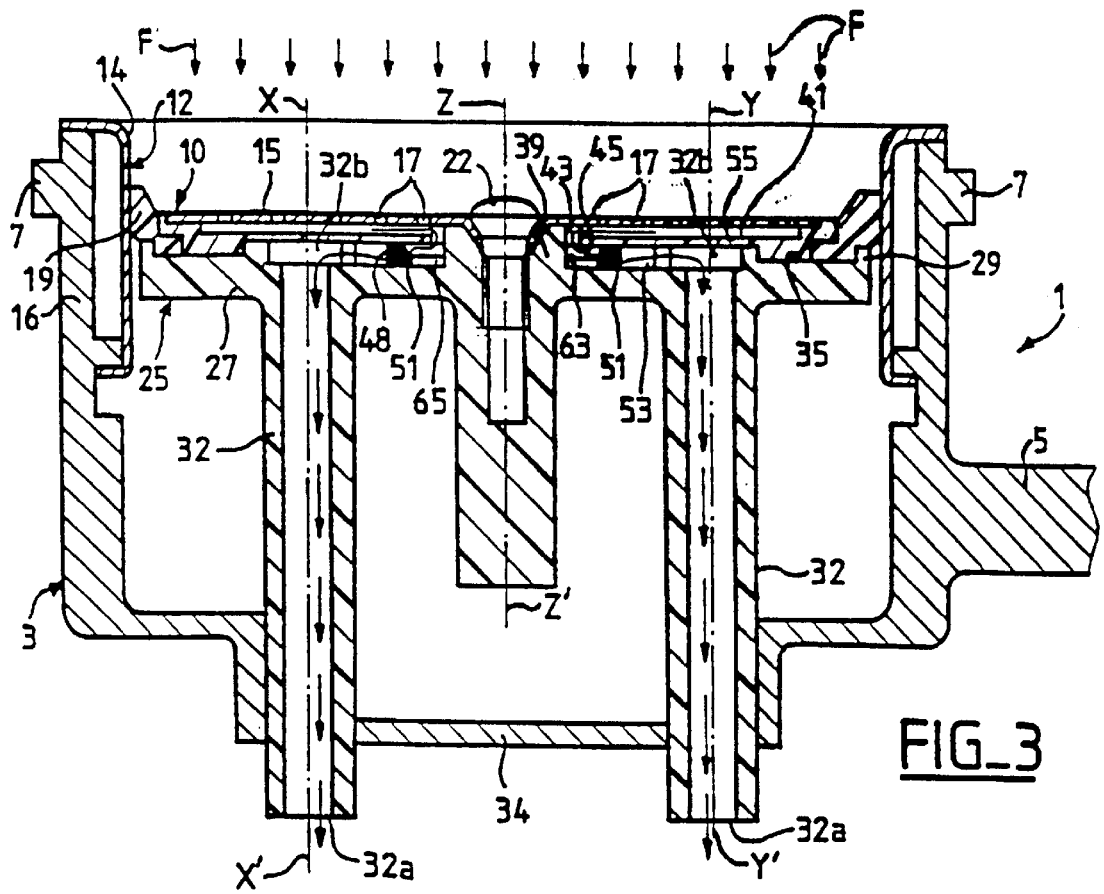
FIG_3
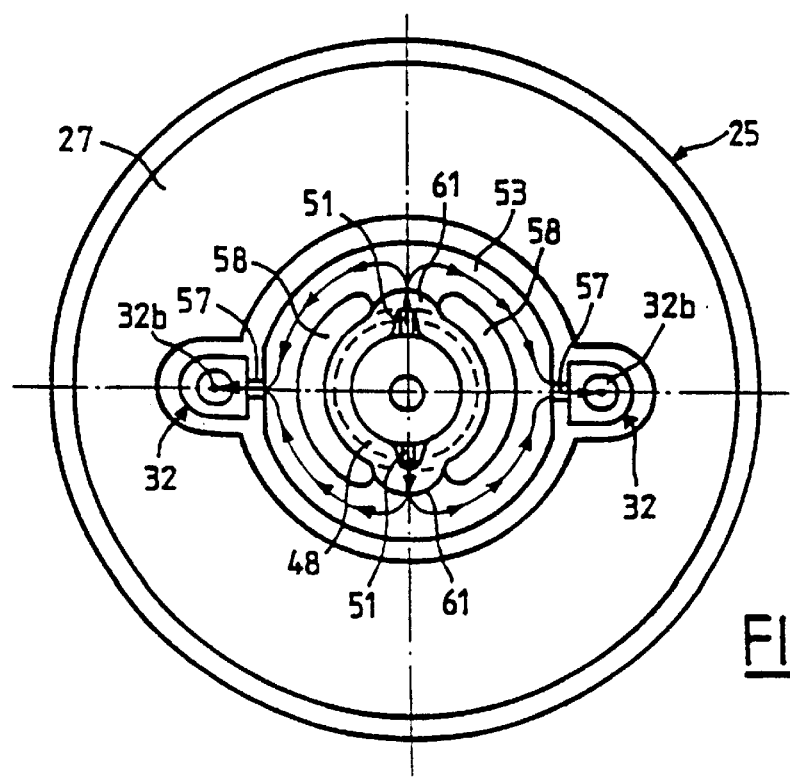
FIG_4

6,012,379

FILTER HOLDER FOR COFFEE MACHINE OF THE ESPRESSO TYPE

FIELD OF THE INVENTION

This invention relates to a filter holder, which is intended to be mounted on an espresso coffee machine and which contains a pan, suitable for receiving a filter, which is intended to contain a measure of ground coffee, said pan having a perforated bottom, a body arranged in the pan below the filter, which is provided with at least one distribution funnel, the lower end of which extends through the bottom of the pan, an infusion collection chamber formed between the bottom of the filter and the upper surface of the body and opening into an output strainer for the infusion, the mouth of which communicates with said funnel, permitting the infusion to run toward the pan, as well as a device for the making of foam.

BACKGROUND OF THE INVENTION

In a known filter holder of this type, used in an espresso machine, bringing hot water to the ground coffee contained in the filter at a pressure of 10 to 15 bars, the production of foam in the infusion leaving the filter is achieved by passing the infusion through an over-pressure valve installed on the upper face of the body, and making the mouth of the infusion output strainer communicate with the distribution funnel. However, such an over-pressure valve is an expensive component and its installation on the upper surface of the body is difficult to achieve.

OBJECT OF THE INVENTION

The main purpose of the invention is to remedy these defects and to achieve a filter holder of the type described above, which is equipped in a simple and lower-cost manner with a device making it possible to produce abundant, thick foam from the infusion.

SUMMARY OF THE INVENTION

According to the invention, the strainer extends in an annular form around a boss formed in the upper surface of the body, and the device for the making of foam has an annular elastic gasket placed around the boss, so as to obstruct the outflow from the strainer, said gasket being deformable by expansion under the effect of the pressure present in the collecting chamber in such a manner, so as to form at least one passage, which places said output in communication with the funnel, permitting the flow of the infusion.

Thus, this annular gasket, which is deformable elastically by expansion, constitutes a simple means to make it possible to obtain, as a result of its expansion, an air-infusion mix sufficiently large to create a thick foam in the coffee obtained. Furthermore, this gasket is inexpensive and is perfectly adapted to manufacturing these filter holders on a large scale.

According to another advantageous characteristic of the invention, the body includes two funnels, arranged symmetrically on each side of the boss, and the filter holder also contains an annular distribution chamber, concentric with the gasket, containing two orifices, which discharge respectively into the two funnels and which is provided with chambers surrounding, on the one hand, only the periphery of the gasket, so as to leave free the peripheral sectors of the gasket, which are diametrically opposed, which extend in a plane perpendicular to that passing through the upper ends of the two funnels and which are intended to be deformed by expansion so as to form two passages opening into the distribution chamber and allowing the infusion, which is distributed equally, to flow into the two funnels via said orifices.

Thus, during the preparation of two cups of coffee placed below the two funnels, one obtains, as a result of the particular arrangement of the two passages for the infusion, with respect to the two funnels, the same flow of coffee through the two funnels and, therefore, the same quantity of coffee in each of the two cups.

BRIEF DESCRIPTION OF THE DRAWING

The characteristics and advantages of the invention are shown primarily in the description, which will follow as an non-limiting example, referring to the attached drawings in which:

FIG. 1 is a vertical section of an inventive filter holder showing the filter holder before the addition of hot water;

FIG. 2 is a partial view from above of a body installed in the filter holder of FIG. 1;

FIG. 3 is a view analogous to FIG. 1 showing the filter holder during the addition of hot water; and FIG. 4 is a view analogous to FIG. 2 for the filter holder of FIG. 3.

DETAILED DESCRIPTION OF THE INVENTION

The filter holder 1, represented in FIGS. 1 and 3, is intended to be installed on an espresso-type coffee machine and includes a pan 3 with a lateral prolongation 5, to which a handle is attached (not represented), which permits it to be handled and, on its outside circumference, protrusions 7, which are intended to connect bayonet-fashion with a fastening device present on a percolation head (not represented) of a type, which is of itself known, intended for the flow of hot water under pressure.

In the pan 3, a filter 10 is arranged, which is intended to contain a measure of ground coffee and which is formed, in the example of the embodiment illustrated in FIGS. 1 and 3, of a cage 12 with lateral cylindrical wall 14 solidly fixed to the side wall 16 of the pan 3 and, through a flat bottom 15, provided with perforations 17, the periphery of which rests on an annular sealing gasket 19 applied against the side wall 14 of the cage 12.

The perforated bottom 15 of the filter 10 is attached, preferably at its center, for example, by means of a screw 22, into a body 25 in the pan 3 below the filter 10 and made up of a cylindrical base 27, the peripheral edge 29 of which is anchored in the sealing gasket 19 and extends downward into distribution funnels 32, with vertical axes respectively XX' and YY', the lower end 32a of which protrudes from the bottom 34 of the pan 3 and the upper end 32b of which opens through the upper surface 35 of the base 27. On this upper surface 35 of the base 27, there is a cylindrical boss 39 on the vertical axis ZZ', into which the bottom 15 of the filter 10 is screwed. As shown in FIGS. 1 and 3, the two funnels 32 are arranged symmetrically with respect to the axis ZZ' of the boss 39.

The filter holder 1 also includes an annular infusion collecting chamber 41, which is placed between the perforated bottom 15 of the filter 10 and the upper surface 35 of the base 27, and which opens into a strainer 43 so that the infusion exit, the mouth 45 of which communicates with each of the two funnels 32, allows the infusion collected to flow out of the pan 3 into two coffee cups placed below.

According to the invention, the strainer 43 runs in a ring around the boss 39 and the filter holder 1 is equipped with a device for the production of foam, which consists of an annular elastic gasket 48 placed around the boss 39, suitable for sealing the mouth 45 of the strainer 43 (FIG. 1 ) and which is deformable by expansion under the effect of the pressure of the water passing through the ground coffee and running in the collection chamber 41 in such a manner, so as to form at least one passage 51 (FIG. 3), which places said mouth 45 in communication with the corresponding funnel 32, so as to allow the infusion to flow.

The gasket 48 is preferably made of an elastomeric material such as, for example, a silicone rubber.

As shown in FIGS. 1 and 3, in this sample embodiment, the filter holder also includes an annular distribution chamber 53, which is machined in the base 27 concentrically with the gasket 48, and which is separated in the collection chamber 41 by a plate 55, placed between the bottom 15 of the filter 10 and the upper surface 35 of the base 27. This distribution chamber 53, which is better visible in FIGS. 2 and 4, has two orifices 57, opening respectively into the two funnels 32, and is provided with two vertical walls 58 circling only a part of the periphery of the gasket 48 in such a manner, so as to leave free two peripheral sectors 61 of said gasket, which are diametrically opposite each other and which extend in a plane perpendicular to that passing through the upper ends 32b of the two funnels 32. These two free sectors 61 of the gasket 48 are destined to be deformed by expansion under the effect of the pressure prevalent in the collecting chamber 41 in such a manner, so as to form two passages 51 (FIG. 3), which open into the distribution chamber 53 and allow the flow of the infusion, which is distributed equally in the two funnels 32 via the orifices 57 (see FIG. 4), thus advantageously assuring the same quantity of coffee in each of the two cups.

In this example, the mouth 45 of the strainer 43 opens onto a peripheral channel 63 placed around the boss 39, sealed by the gasket 48 (see FIGS. 1 and 2) and is intended, after the expansion of the two free sectors 61 of the gasket 48, to communicate directly with the two passages 51, respectively (see FIG. 3).

In FIG. 1, the gasket 48 is mounted on a disk 65 placed around the boss 39 by being applied to the upper surface 35 of the base 27, and is interposed in support, before expansion, between the plate 55 and the disk 65. When the two free sectors 61 of the gasket 48 expand, they disengage from the plate 55, in order to form, below the gasket 48, the two passages 51 opening into the distribution chamber 53.

Thus, when the hot water under pressure (symbolized by the arrows F on FIG. 3) is fed to the ground coffee contained in the filter 10, the infusion, collected in the collecting chamber 41, passes into the strainer 43 and then into the channel 63, causing the two free sectors 61 of the gasket 48 to expand (FIG. 4) in such a manner, so as to flow through the two passages 51, forming the foam upon contact with the air. The infusion thus enriched with foam is distributed thereafter in an equal manner in the distribution chamber 53 and flows then equally through the two guide funnels 32 via the two corresponding orifices 57 (FIG. 4).

I claim:

1. A filter holder, which is intended to be installed on an espresso coffee machine, includes a pan, adapted to receive a filter, which is intended to contain a measure of ground coffee, said filter having a perforated bottom, a body, placed in the pan below the filter and provided with at least one distribution funnel, the lower end of which extends through the bottom of the pan, an annular chamber to collect the infusion formed between the bottom of the filter and the upper surface of the body and opening into a strainer, through which the infusion exits, wherein the strainer extends in an annular fashion around a bossing created in the upper surface of the body, the mouth of the strainer communicating with said funnel, permitting the infusion to flow out of the pan, and a device for the production of foam having an elastic annular gasket placed around the bossing, which is suitable for blocking the mouth of the strainer and which is deformable by expansion under the effect of the pressure prevalent in the collection chamber in such a manner, so as to form at least one passage, which places said mouth in communication with the funnel, permitting the flow of the infusion.

2. The filter holder of claim 1, wherein the body, includes two distribution funnels, placed symmetrically on each side of the bossing, said filter holder also including a distribution chamber, concentric with the gasket, which has two orifices opening respectively into the two funnels and which is provided with walls blocking off only one part of the periphery of the gasket in such a manner, so as to leave free two peripheral sectors of said gasket, which are diametrically opposed, which extend in a plane perpendicular to that passing through the upper ends of the two funnels and which are intended to be deformed by expansion, so as to form two passages, which open into the distribution chamber and allow a flow of the infusion, which is distributed in an equal manner into the two funnels via the two orifices.

3. The filter holder of claim 2, wherein the mouth of the strainer opens into a peripheral channel placed around the bossing, sealed by the gasket and is intended, after expansion of the two free sections of said gasket, to communicate directly with the two passages of the infusion, respectively.

4. The filter holder of claim 2 wherein the collecting chamber and the distribution chamber are separated from each other by a plate, which is placed between the bottom of the filter and the upper surface of the body.

5. The filter holder of claim 4, wherein the gasket is installed on a disk arranged around the bossing and applied to the upper surface of the body, said gasket being interposed, before the expansion, in support between the plate and the disk, and the two free sectors disengaging said disk during the expansion of said sectors to form the two passages opening into the distribution chamber.

6. The filter holder of claim 1, wherein the gasket is made of an elastomeric material.

7. The filter holder of claim 6, wherein the gasket is made of silicone rubber.

* * * * *